United States Patent [19]
York, Jr.

[11] 3,759,287
[45] Sept. 18, 1973

[54] TWO-WAY PRESSURE RELIEF ASSEMBLY

[75] Inventor: Jimmie D. York, Jr., Louisville, Ky.

[73] Assignee: American Air Filter Company, Inc., Louisville, Ky.

[22] Filed: Mar. 6, 1972

[21] Appl. No.: 231,904

[52] U.S. Cl. ............................................ 137/493.9
[51] Int. Cl. ........................................... F16k 45/00
[58] Field of Search ................. 137/493.9, 493, 180

[56] References Cited
UNITED STATES PATENTS

| | | | |
|---|---|---|---|
| 1,248,118 | 11/1917 | Hoffman | 137/493 X |
| 1,185,333 | 5/1916 | Keltner | 137/493 X |
| 1,412,357 | 4/1922 | Kramer | 137/493.9 X |
| 1,428,928 | 9/1922 | Whaley | 137/493.9 |

FOREIGN PATENTS OR APPLICATIONS

| | | | |
|---|---|---|---|
| 582,993 | 10/1958 | Italy | 137/493.9 |
| 995,669 | 7/1949 | France | 137/493 |

Primary Examiner—Henry T. Klinksiek
Assistant Examiner—Robert J. Miller
Attorney—Robert W. Fletcher et al.

[57] ABSTRACT

A two-way pressure relief assembly for a plenum chamber including, at least two ported valve seats communicating with an outlet of the plenum chamber, and a plurality of relief valves adapted to respond to fluid pressure surges of a preselected magnitude, one valve cooperating with each ported valve seat, with at least one of the valves being responsive to fluid pressure surges of a preselected magnitude in a direction counter to the direction of fluid pressure surges to which the remainder are responsive.

3 Claims, 1 Drawing Figure

PATENTED SEP 18 1973
3,759,287
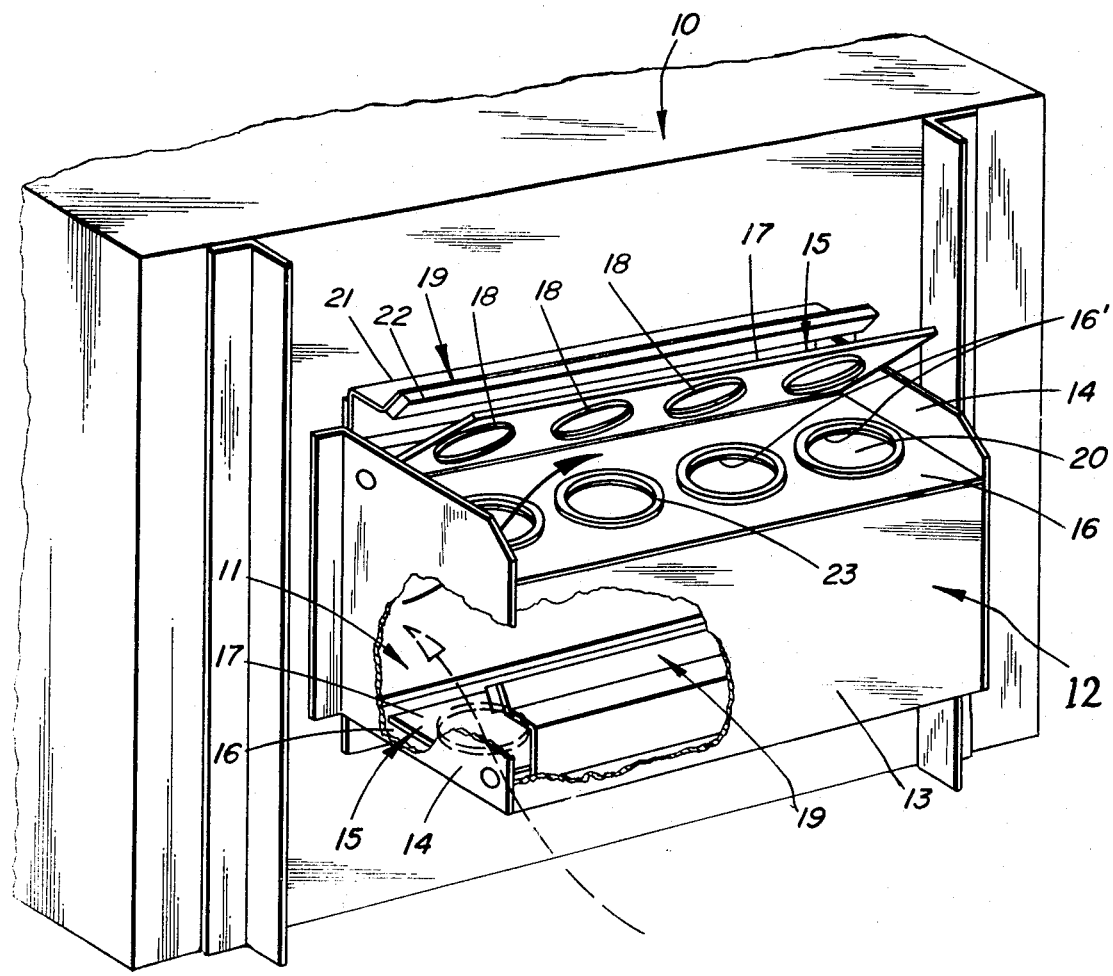

TWO-WAY PRESSURE RELIEF ASSEMBLY

BACKGROUND OF THE INVENTION

Various types of pressure relief assemblies for plenum chambers subject to undesirably high pressure pulses are known in the art. Many of the past pressure relief assemblies have been expensive to construct, operate and maintain and often there has been frequent wear of the several parts of the asembly with resultant inefficient and non-uniform sealing thereof. In addition, these pressure relief assemblies have been designed to relieve pressures in only one direction so that heretofore pressure relief in both directions from a single relief assembly has been unknown. In accordance with the present invention, a straightforward, economical and efficient pressure relief assembly is provided, which avoids the difficulties of the past assemblies and which, at the same time, provides pressure relief of fluid pressure surges in opposite directions, while responding quickly to such pressure surges, yet maintaining a preselected desired pressure in the plenum chamber during normal operation. In addition, the present invention provides means to preselectively determine the magnitude of pressure to which the relief assembly will respond.

Various other features of the present invention will become obvious to one skilled in the art upon reading the portion of the disclosure set forth hereinafter.

SUMMARY OF THE INVENTION

More particularly, the present invention provides a two-way pressure relief assembly for a plenum chamber comprising, at least two ported valve sets each in flow communication with an outlet of the plenum chamber and a plurality of fluid impervious relief valves adapted to respond to fluid pressure surges of a preselected magnitude, one of the valves cooperating with each ported valve seat, in covering relation therewith, and at least one of the valves being responsive to fluid pressure surges of a preselected magnitude in a direction counter to the direction of fluid pressure surges to which the remainder are responsive. The two-way pressure relief assembly of this invention has been found to be a simple, yet effective method of protecting, for example, heating or air conditioning systems from explosions and other abnormally rapid pressure increases, which would cause the housings to collapse or to be deformed sufficiently to lose integrity, whether these occurances be external to the systems or internal to the systems.

DESCRIPTION OF THE DRAWINGS

The FIGURE is a partially cut away perspective view of the two-way pressure relief assembly of this invention.

DESCRIPTION OF THE PREFERRED EMBODIMENT

As can be seen in the FIGURE of the drawing, plenum chamber 10 (only a wall portion of which is disclosed) is provided with outlet 11. Surrounding the peripheral edge of outlet 11 is housing 12 which is comprised of sidewall 13, end walls 14 and opposed ported valve seat walls 16. Ported valve seat walls 16 are shown as each being made up of a plate having a plurality of orifices 20 which communicate with the interior of housing 12 and provide relief means for pressures which may build up internally or externally thereto. Overlying ported valve seats 16' of walls 16 are valves 15, which are sized to prevent fluid passage through the orifices under normal operating pressures within the plenum chamber. Valves 15 are advantageously flat plates of metal sized to cover the orifices and are hingedly attached along one edge thereof to provide for rotational movement angularly away from the surface of ported valve seat walls 16 in response to pressure surges acting on the underside thereof, through the orifices. As can be seen from FIG. 1, the upper of the ported valve seat walls 16 has its underside exposed to the interior of the housing 12 while the underside of the lower valve seat wall is exposed to the ambient surroundings. Such an arrangement allows for pressure relief either into the plenum chamber and associated duct work or out of the same.

Advantageously, valves 15 are comprised of a body portion 17 and blades 18 which are preselectively located on body portion 17 in axial alignment with resilient seals 23, which each circumscribe a ported valve seat 16' in such a manner that the edges of blades 18 rest in a deforming manner upon resilient seals 23. Such an arrangement allows maximum sealing efficiency when the valve is in its closed position (lower valve of FIG. 1), yet allows for positive pressure relief when the valve rotates away from ported valve seat wall 16 in response to a pressure surge of preselected magnitude acting thereupon (upper valve of FIG. 1). Valves 15 are advantageously flat plates which provide a uniform force downwardly upon blade 18, which force is then transmitted to the resilient seal 23 to establish the seal. These valves may be preselectively sized in weight or thickness to provide for a predetermined pressure release, or may have additional weights attached on their upper sides to achieve the same end. Alternatively, valves 15 may be spring loaded to allow for preselected pressure relief. Located above valves 15 are stops 19 which function to prevent valves 15 from passing over center when relieving pressure thus insuring that the valves will return to their sealing position upon return to normal operating conditions. Stops 19 are comprised of braces 21 which support bumpers 22 in prealigned position above valves 15. Bumpers 22 can be fabricated from any one of a number of resilient materials. Advantageously, cork or heat resistent vinyl rubber may be used.

The FIGURE shows how the present invention is attached to a plenum chamber and how it operates. As can be seen fluid tight housing 12 containing ported valve seats 16 and valves 15, positioned thereabove, provide for the release of pressure surges which exceed a preselected magnitude. During conditions of normal operation valves 15 lie flat one on each of the ported valve seat walls 16 with blades 18 in sealing relationship resting on and deforming resilient seals 23, which encircle the ported valve seats 16'. When an explosion or abnormally high pressure surge occurs, for example within the plenum chamber 10, the increased pressure causes upper valve 15 to open thereby allowing the pressure to escape out the orifices in the upper of ported valve seat walls 16. After the pressure has been vented, upper valve 15 is pulled by gravity back into sealing position upon ported valve seats 16'. It should be noted that the function of relieving pressure surges is not limited merely to explosions within plenum chamber 10, but the pressure relief assembly also protects against explosions which may occur in rooms connected by ductwork to plenum chamber 10.

The two-way relief protection provided by the present invention is exemplified by the fact that if an explosion occurs outside plenum chamber 10, for example, in a furnace room containing the plenum chamber, lower valve 15 will be forced open in the same manner as described above with regard to upper valve 15, and the pressure will be relieved into plenum chamber 10. Thus, the walls of the plenum chamber are not exposed to crumpling, destructive forces; and damage due to explosion is kept to a minimum.

I claim:

1. A two-way pressure relief assembly for a plenum chamber comprising: at least two ported valve seats each disposed in a separate wall having a plurality of orifices therein and each in flow communication with an outlet of said plenum chamber; and a plurality of fluid impervious relief valves adapted to respond to fluid pressure surges of a preselected magnitude, one of said valves cooperating with each ported valve seat in covering relation therewith, allowing the passage of fluid therethrough when its corresponding relief valve is in an open position, and at least one of said valves being responsive to fluid pressure surges of a preselected magnitude in a direction counter to the direction of fluid pressure surges to which the remainder are responsive.

2. The two-way pressure relief assembly of claim 1 wherein said ported valve seats are disposed in generally flat plates containing a plurality of orifices, said valve seats lying in generally parallel planes disposed axially with respect to each other; and said valves are disposed in generally flat plates sized to cover said orifices in said valve seats and hinged for rotational movement above said valve seats to provide for opening of the valves in response to pressure surges of a preselected magnitude acting thereupon through said orifices.

3. The two-way pressure relief assembly of claim 2 additionally comprising blades and resilient seals, said blades being attached to the valve seat engaging side of said valves and said resilient seals being attached to the valve engaged side of the ported valve seat, each seal circumscribing an orifice in said valve seat and each being axially aligned with a corresponding blade to be deformed thereby to effect a positive seal therewith when said valve is in its closed position.

* * * * *